Figure 1:
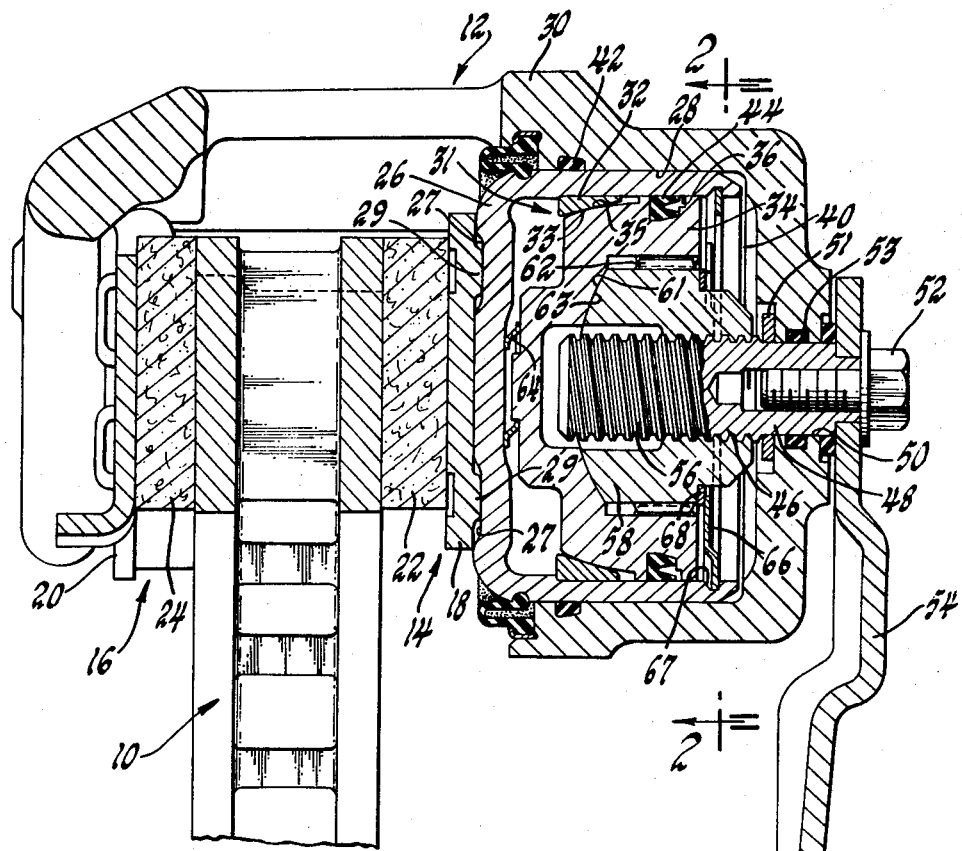

United States Patent
De Hoff et al.

[15] 3,688,875
[45] Sept. 5, 1972

[54] DISC BRAKE CALIPER WITH INTEGRAL PARKING BRAKE

[72] Inventors: Edward J. De Hoff, Dayton; Ernest D. Schaefer, Kettering, both of Ohio

[73] Assignee: General Motors Corporation, Detroit, Mich.

[22] Filed: April 7, 1971

[21] Appl. No.: 131,936

[52] U.S. Cl............188/71.9, 188/72.6, 188/196 F, 192/111 A
[51] Int. Cl.............................................F16d 65/56
[58] Field of Search..........188/71.9, 72.6, 72.8, 72.9, 188/196 F; 192/111 A

[56] References Cited

UNITED STATES PATENTS

| | | |
|---|---|---|
| 3,331,472 | 7/1967 | Swift..........................188/71.9 |
| 3,584,711 | 6/1971 | Margetts...............188/72.6 X |

FOREIGN PATENTS OR APPLICATIONS

| | | | |
|---|---|---|---|
| 971,799 | 10/1964 | Great Britain............188/71.9 |

*Primary Examiner*—George E. A. Halvosa
*Attorney*—W. E. Finken and D. D. McGraw

[57] ABSTRACT

A disc brake caliper includes a hollow piston slidable in the caliper housing, a second piston slidable in the hollow piston and normally positioned relative thereto so that mating frusto-conical surfaces formed on the pistons are engaged to prevent relative rotation therebetween and an adjuster nut which is splined to the second piston and which normally engages the second piston to hold it and the first piston in close relationship to the disc. The adjuster nut threadedly engages a screw which is rotatably journaled in the housing so that rotation of the screw imparts axial brake actuating movement to the rotationally stationary adjuster nut, second piston, and hollow piston. The spline connection permits the pistons to move unitarily toward the disc upon introduction of hydraulic fluid into the housing. If lining wear occurs, the hollow piston is returned into the caliper housing short of its preactuation position, a spring acting between the pistons moves the second piston away from the first to disengage the frusto-conical surfaces and then a second spring rotates the adjuster nut and the second piston splined thereto thus moving the second piston axially to re-engage the frusto-conical surfaces and hold the hollow piston in closer wear adjusting relationship to the disc.

3 Claims, 2 Drawing Figures

PATENTED SEP 5 1972 3,688,875

INVENTORS
Edward J. DeHoff &
BY Ernest D. Schaefer

D. D. McGraw
ATTORNEY

DISC BRAKE CALIPER WITH INTEGRAL PARKING BRAKE

The invention relates to an improved disc brake caliper assembly and more particularly to a disc brake caliper assembly which provides hydraulic actuation for service braking, mechanical actuation for parking braking and automatic adjustment for brake lining wear.

It is desirable in an automotive disc brake caliper assembly to provide hydraulic actuation of the brakes for service braking and mechanical actuation of the brakes for emergency and parking braking. It is also desirable to provide an automatic wear adjusting mechanism which maintains the brake shoes in close relationship to the disc by preventing excessive knockback of the piston into the caliper so that the minimal amount of brake shoe travel is required to brake the vehicle.

The invention features a cone clutch and spline arrangement which permits an extendible member formed by a screw and a functions.

The disc brake caliper assembly of this invention includes a hollow piston which is slidable in the caliper housing and a second piston which is slidable in the hollow piston. The second piston is normally positioned relative the hollow piston so that mating frusto-conical surfaces formed on each of the pistons are engaged. The mechanical actuating and adjusting mechanism includes a screw which is rotatably journaled in the housing but fixed axially relative thereto and an adjuster nut which is threadedly received on the screw and abuttingly engages the second piston when the brakes are released. A spline connection between the adjuster nut and second piston prevents rotation of the adjuster nut on the screw whenever the cone clutch formed by the engagement of the frusto-conical surfaces prevents relative rotation between the pistons. Thus, rotation of the screw imparts axial brake actuating movement to the rotationally stationary adjuster nut, second piston, and hollow piston.

Hydraulic actuation is by introduction of pressurized fluid to the chamber formed by the caliper housing, the hollow piston and the second piston. The hollow piston and second piston move unitarily toward the disc while the reaction force is transferred through the caliper, thus forcing the brake shoes into engagement with the disc.

Figure 2:
Figure 2:
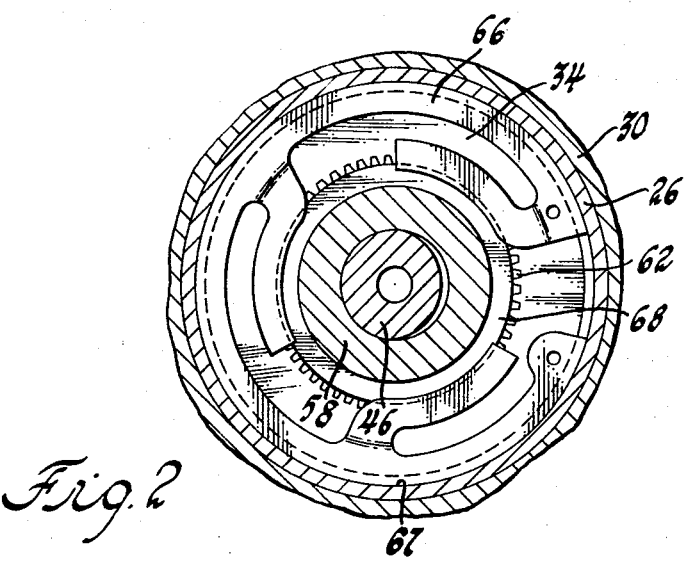

If lining wear occurs during hydraulic actuation, the hollow piston is returned into the caliper housing short of its preactuation position therein. A spring acting between the hollow piston and the second piston then moves the second piston away from the first piston to disengage the cone clutch and a second spring rotates the adjuster nut and the second piston splined thereto causing them to advance on the screw and thus move the second piston axially to re-engage the cone clutch and hold the hollow piston in closer relationship to the disc, In the drawings:

FIG. 1 is a cross-section view of the disc brake caliper assembly showing the caliper in the brake released position; and FIG. 2 is a sectional view taken in the direction of arrows 2—2 of FIG. 1.

Referring to FIG. 1, the disc brake assembly includes a disc 10 which is attached to the vehicle wheel assembly for rotation therewith, and a caliper assembly 12 which is suitably attached to a stationary vehicle member not shown. Inner and outer brake shoe assemblies 14 and 16 are positioned on opposite sides of disc 10 and include backing plates 18 and 20 to which are secured suitable brake linings 22 and 24. Shoe assembly 14 is connected to either the caliper 12 or the stationary vehicle member in a manner which prevents rotary movement thereof relative the caliper. Shoe assembly 16 is suitably attached to either caliper 12 or the stationary vehicle member. A hollow piston 26 is slidable in an axially extending bore 28 formed in the caliper housing 30. Piston 26 has plurality of recesses 27 in the piston face which mate with projections 29 formed on backing plate 18. Piston 26 is thereby prevented from rotating in the bore 28.

A second hollow piston 34 is slidable in a bore 36 formed in hollow piston 26. A cone clutch, generally indicated at 31, acts between pistons 26 and 34. The cone clutch 31 includes an annular clutch member 32 which is press fitted into piston 26. The inner periphery of the clutch element 32 forms a frusto-conical surface 33 which is engageable with a mating frusto-conical surface 35 formed on the outer periphery of piston 34. FIG. 2 shows the cone clutch 31 in its normal or operative condition wherein the frictional engagement of the frusto-conical surfaces 33 and 35 prevents rotation of piston 34 and also provides an axial force transmitting connection between the two pistons. The caliper housing 30, piston 26, and piston 34 cooperate to define chamber 40 which is pressurizable to force piston 34, piston 26, and shoe assembly 14 toward the disc 10 whereby the shoe assembly 14 is forced into braking engagement with the disc 10 and the reaction force is transferred through the caliper housing 30 to force brake shoe assembly 16 into braking engagement with the other side of the disc 10. The fluid integrity of chamber 40 is maintained by a seal 42 located between caliper housing 30 and piston 26 and a seal 44 located between pistons 26 and 34. Thus, it can be seen that the structure embodying the invention provides hydraulic actuation for service braking.

The invention also provides automatic wear adjustment and auxiliary actuation for parking. A screw 46 includes a shank 48 which extends through a bore 50 in the caliper housing 30. A bolt 52 attaches a lever 54 to the shank 48 of screw 46. A parking brake cable 55 is attached to the lever 54 and can be tensioned to rotate the lever 54 and the screw 46 attached thereto. The screw 46 includes a high lead thread 56 which extends into the hollow second piston 34. The end of thread 56 at shank 43 provides a shoulder which engages a thrust washer 51 seated at housing 30 and so prevents axial movement of the screw 46 relative the caliper housing in the direction away from disc 10. An adjuster nut 58 is threaded to be received on the high lead thread 56 of screw 46. The end of adjuster nut 58 forms a convex surface 61 which is engageable with a mating concave surface 63 formed on piston 34. A splined connection 62 is formed between adjuster nut 58 and piston 34. A spring washer 64 acts between piston 26 and piston 34 urging them apart to effect disengagement of the frusto-conical surfaces 33 and 35 of cone clutch 31. A finger washer spring 66, best shown in FIG. 2, is seated in groove 67 of piston 26 and acts through an antifriction washer 68 to urge adjuster nut 58 to rotate on screw 46. A torsion or compression spring acting between the adjuster nut 58 and either screw 46, caliper housing 30 or piston 26 may be substituted for finger washer spring 66. A seal 53 is located between shank 48 of screw 46 and the caliper housing 30.

FIG. 1 shows the disc brake caliper in the normal rest position. The preload of spring 66 acts through the engagement of adjuster nut 58 with second piston 34 to engage the frusto-conical surface 35 on piston 34 with the clutch element 32. It is noted that piston 26 cannot be knocked back into caliper housing 30 since the engagement of clutch 31 prevents rotation and consequent axial movement of piston 34 and adjuster nut 58 splined thereto. The brake shoe assemblies 14 and 16 are thereby held in close relationship to the disc 10.

OPERATION

When the brakes are hydraulically applied, the introduction of pressurized brake fluid into expansible chamber 40 displaces second piston 34, piston 26, and brake shoe assembly 14 toward disc 10. Reaction forces transferred through the caliper housing 30 and forces brake shoe assembly 16 into braking engagement with the other side of disc 10. Since the cone clutch is engaged during hydraulic actuation, the second piston 34 and the adjuster nut 58 splined thereto cannot rotate. While the splined connection 62 does not permit adjuster nut 58 to rotate, it does allow the second piston 34 to move axially away from adjuster nut 58 causing a gap to develop between surfaces 61 and 63. In the event of lining wear during the hydraulic actuation, the piston 26 will not be returned to its preactuation position in caliper housing 30 due to the frictional resistance between the piston 26 and the bore 28 and seal 42. Spring 64 then urges the second piston 34 away from piston 26 closing the gap between second piston 34 and adjuster nut 58 so that the surfaces 61 and 63 are again engaged. The disengagement of cone clutch 31 permits the spring 66 to advance the adjuster nut 58 on the screw 46. The second piston 34 rotates with the adjuster nut 58 until the second piston 34 is advanced toward the disc 10 sufficiently to re-engage the cone clutch 31. Subsequent to this adjusting movement of the adjuster nut 58 and the second piston 34, the piston 26 cannot be knocked further back into the caliper housing 30 since the engagement of the cone clutch 31 and action of spline connection 62 will not permit the adjuster nut 58 to rotate upon the screw 46.

The vehicle operator accomplishes auxiliary actuation of the brake for vehicle parking by actuation of a cable tensioning device which causes rotation of lever 54. Rotation of lever 54 and screw 46 bolted thereto forces the adjuster nut 58, second piston 34, piston 26, and brake shoe assembly 14 unitarily toward the disc 10. The adjuster nut 58 cannot turn with the screw 46 due to the engagement of the cone clutch 31 and the action of splined connection 62. Thrust washer 51 transmits the reaction force to the caliper housing 30 and also minimizes the frictional losses incident to rotation of screw 46. When the tension is relieved in the cable 55, lever 54 and screw 56 return to their rest position, the adjuster nut 58 moves axially to its initial position and piston 26 is returned into housing 30. In the event that lining wear has occurred, the spring 64 disengages the cone clutch permitting the spring 66 to advance adjuster nut 58 and piston 34 to re-engage the clutch and prevent further knockback of piston 26 into caliper housing 30.

What is claimed is:
1. A disc brake caliper assembly for braking a rotating disc and comprising:
  a caliper housing;
  first and second brake shoe assemblies located respectively on opposite sides of the disc, the first brake shoe assembly engaging the caliper housing;
  a first piston sealingly slidable in the housing and engaging the second brake shoe assembly;
  means preventing rotation of the first piston in the housing;
  a second piston sealingly slidable in the first piston and cooperating with the first piston and the housing to define a chamber;
  cone clutch means acting between the first and second pistons, the cone clutch means being normally engaged to prevent rotary movement of the second piston and being disengageable upon axial movement of the second piston relative to the first piston in the direction axially away from the disc;
  means providing an axial force transmitting connection between the first and second pistons when the cone clutch means is engaged;
  an adjuster nut normally in axial force transmitting engagement with the second piston;
  spline means connecting the adjuster nut and the second piston preventing relative rotary movement therebetween and permitting axial movement of the second piston out of engagement with the adjuster nut;
  means associated with the housing threadedly engaging the adjuster nut and imparting axial movement to the adjuster nut and the second piston upon rotary movement of the associated means;
  means for introducing fluid pressure to the chamber to displace the first and second pistons unitarily toward the disc;
  spring means acting on the second piston to move the second piston relative to the first piston in the direction axially away from the disc and thereby disengage the cone clutch means;
  and second spring means acting to impart rotary and axial movement of the adjuster nut and second piston toward the disc when the cone clutch means is disengaged thereby effecting re-engagement of the cone clutch means and holding the first piston in closer wear adjusting relationship with the disc.

2. A disc brake caliper assembly for braking a rotating disc and comprising:
  a caliper housing;
  first and second brake shoe assemblies located respectively on opposite sides of the disc, the first brake shoe assembly engaging the caliper housing;
  a first hollow piston sealingly slidable in the housing and engaging the second brake shoe assembly;
  means preventing rotation of the first piston in the housing;
  means forming a frusto-conical surface on the inner periphery of the first piston;
  a second piston sealingly slidable in the first piston and cooperating with the first piston and the housing to define a chamber;

means forming a frusto-conical surface on the outer periphery of the second piston, the second piston having a normal axial position relative the first piston wherein the respective frusto-conical surfaces are engaged to prevent rotary motion of the second piston and provide an axial force transmitting connection between the first and second pistons, the second piston being movable relative to the first in the direction away from the disc to disengage the frusto-conical surfaces;

an adjuster nut normally in axial force transmitting engagement with the second piston;

spline means connecting the adjuster nut and the second piston preventing relative rotary movement therebetween and permitting axial movement of the second piston out of engagement with the adjuster nut;

means associated with the housing threadedly engaging the adjuster nut and imparting axial movement to the adjuster nut and the abutting second piston upon rotary movement of the associated means whereby the first piston is moved axially in the housing to effect mechanical actuation and release of the brake;

means for introducing fluid pressure to the chamber to generate a force on the first and second pistons to effect forced engagement of the brake pad assemblies with the disc and maintain engagement of the frusto-conical surfaces;

spring means acting on the second piston to move the second piston relative to the first piston in the direction disengaging the respective frusto-conical surfaces;

and second spring means effecting rotary and axial movement of the adjuster nut and second piston toward the disc only when the frusto-conical surfaces are disengaged thereby effecting re-engagement of the frusto-conical surfaces and holding the first piston in closer wear adjusting relationship with the disc.

3. A disc brake caliper assembly for braking a rotating disc and comprising:

a caliper housing;

first and second brake shoe assemblies located respectively on opposite sides of the disc, the first brake shoe assembly engaging the caliper housing;

a first hollow piston sealingly slidable in the housing and associated with the second brake shoe assembly in a manner preventing rotation of the first piston in the housing;

a clutch element attached to the inner periphery of the first piston, the inner periphery of the clutch element forming a frusto-conical surface;

a second hollow piston sealingly slidable in the first piston and cooperating with the first piston and the housing to define a chamber, the outer periphery of the second piston forming a frusto-conical surface, the second piston having a normal axial position relative the first piston wherein the respective frusto-conical surfaces are engaged to prevent rotary movement of the second piston and provide an axial force transmitting connection between the first and second pistons, the second piston being movable relative the first in the direction axially away from the disc to disengage the frusto-conical surfaces;

an adjuster nut normally in axial force transmitting engagement with the second piston;

spline means connecting the adjuster nut and the second piston and preventing relative rotary movement therebetween and permitting axial movement of the second piston out of engagement with the adjuster nut;

screw means rotatably received through the caliper housing and threadedly engaging the adjuster nut, the screw means including axial thrust receiving means engaging the caliper housing;

means adapted to rotate the screw means whereby axial movement is imparted to the adjuster nut and the abutting second piston to move the first piston axially in the housing to effect actuation and release of the brake;

means for introducing fluid pressure to the chamber to generate a force on the first and second pistons moving the second piston out of engagement with the second piston, effecting forced engagement of the brake pad assemblies with the disc, and maintaining engagement of the frusto-conical surfaces;

spring means acting on the second piston and effective upon release of fluid pressure to move the second piston relative the first piston thereby effecting disengagement of the frusto-conical surfaces and re-engagement of the second piston with adjuster nut;

and second spring means acting to impart rotary and axial movement to the adjuster nut and the second piston toward the disc when the frusto-conical surfaces are disengaged thereby effecting re-engagement of the frusto-conical surfaces and holding the first piston in closer wear adjusting relationship with the disc.

* * * * *

PO-1050
(5/69)

UNITED STATES PATENT OFFICE
CERTIFICATE OF CORRECTION

Patent No. 3,688,875            Dated September 5, 1972

Inventor(s) Edward J. De Hoff, Ernest D. Schaefer

It is certified that error appears in the above-identified patent and that said Letters Patent are hereby corrected as shown below:

Column 1, line 20, after "a" (second occurence) insert --nut to provide both the adjusting and mechanical actuating--.

Signed and sealed this 6th day of March 1973.

(SEAL)
Attest:

EDWARD M. FLETCHER, JR.            ROBERT GOTTSCHALK
Attesting Officer                   Commissioner of Patents